(12) United States Patent  
Kirmayer

(10) Patent No.: US 7,843,339 B2
(45) Date of Patent: Nov. 30, 2010

(54) SECURE POINT OF SALE DEVICE EMPLOYING CAPACITIVE SENSORS

(75) Inventor: Ehud Kirmayer, Moshav Orot (IL)

(73) Assignee: Verifone, Inc., San Jose, CA (US)

( * ) Notice: Subject to any disclaimer, the term of this patent is extended or adjusted under 35 U.S.C. 154(b) by 658 days.

(21) Appl. No.: 11/845,435

(22) Filed: Aug. 27, 2007

(65) Prior Publication Data

US 2009/0058628 A1    Mar. 5, 2009

(51) Int. Cl.
G08B 13/26    (2006.01)
G08B 13/14    (2006.01)
G08B 1/08    (2006.01)

(52) U.S. Cl. ............... 340/562; 340/568.1; 340/568.7; 340/570; 340/539.23

(58) Field of Classification Search ............... 340/562
See application file for complete search history.

(56) References Cited

U.S. PATENT DOCUMENTS

| 4,593,384 | A |   | 6/1986  | Kleijne et al. |
| 4,807,284 | A |   | 2/1989  | Kleijne et al. |
| 5,237,307 | A | * | 8/1993  | Gritton ............ 340/572.1 |
| 5,353,350 | A |   | 10/1994 | Unsworth et al. |
| 5,675,319 | A | * | 10/1997 | Rivenberg et al. ..... 340/550 |
| 5,861,662 | A |   | 1/1999  | Candelore |
| 5,877,547 | A |   | 3/1999  | Rhelimi et al. |
| 5,998,858 | A |   | 12/1999 | Little et al. |
| 6,359,338 | B1 |  | 3/2002  | Takabayashi et al. |
| 6,414,884 | B1 |  | 7/2002  | DeFelice et al. |
| 6,438,825 | B1 |  | 8/2002  | Kuhn |
| 6,646,565 | B1 | * | 11/2003 | Fu et al. ............ 340/687 |
| 6,853,093 | B2 |  | 2/2005  | Cohen et al. |
| 6,874,092 | B1 | * | 3/2005  | Motoyama et al. ...... 713/300 |
| 7,170,409 | B2 | * | 1/2007  | Ehrensvard et al. .... 340/539.26 |
| 2005/0184870 | A1 | * | 8/2005 | Galperin et al. ........ 340/568.2 |

FOREIGN PATENT DOCUMENTS

| EP | 0375545 | 6/1990 |
| EP | 1432031 | 6/2004 |
| GB | 2372363 | 8/2002 |

OTHER PUBLICATIONS

Van Ess, Dave. "Capacitive Touch Switches for Automotive Applications." http://www.automotivedesignline.com/, Feb. 2006.
Kremin, Victor et al. "Capacitive Sensing—Waterproof Capacitance Sensing." Cypress Perform, Dec. 2006.

* cited by examiner

Primary Examiner—Daniel Wu
Assistant Examiner—Mark Rushing
(74) Attorney, Agent, or Firm—Fish & Richardson P.C.

(57) ABSTRACT

A point of sale device including a housing, a protected enclosure located within the housing, information storage functionality located within the protected enclosure and storing information to be protected information, a capacitance sensor based security system including at least one capacitance sensor operative to sense the capacitance of at least one of at least part of the housing and at least part of the protected enclosure at a reference time and thereafter and to provide an alarm indication of at least a predetermined change in the capacitance sensed by the at least one capacitance sensor.

31 Claims, 6 Drawing Sheets

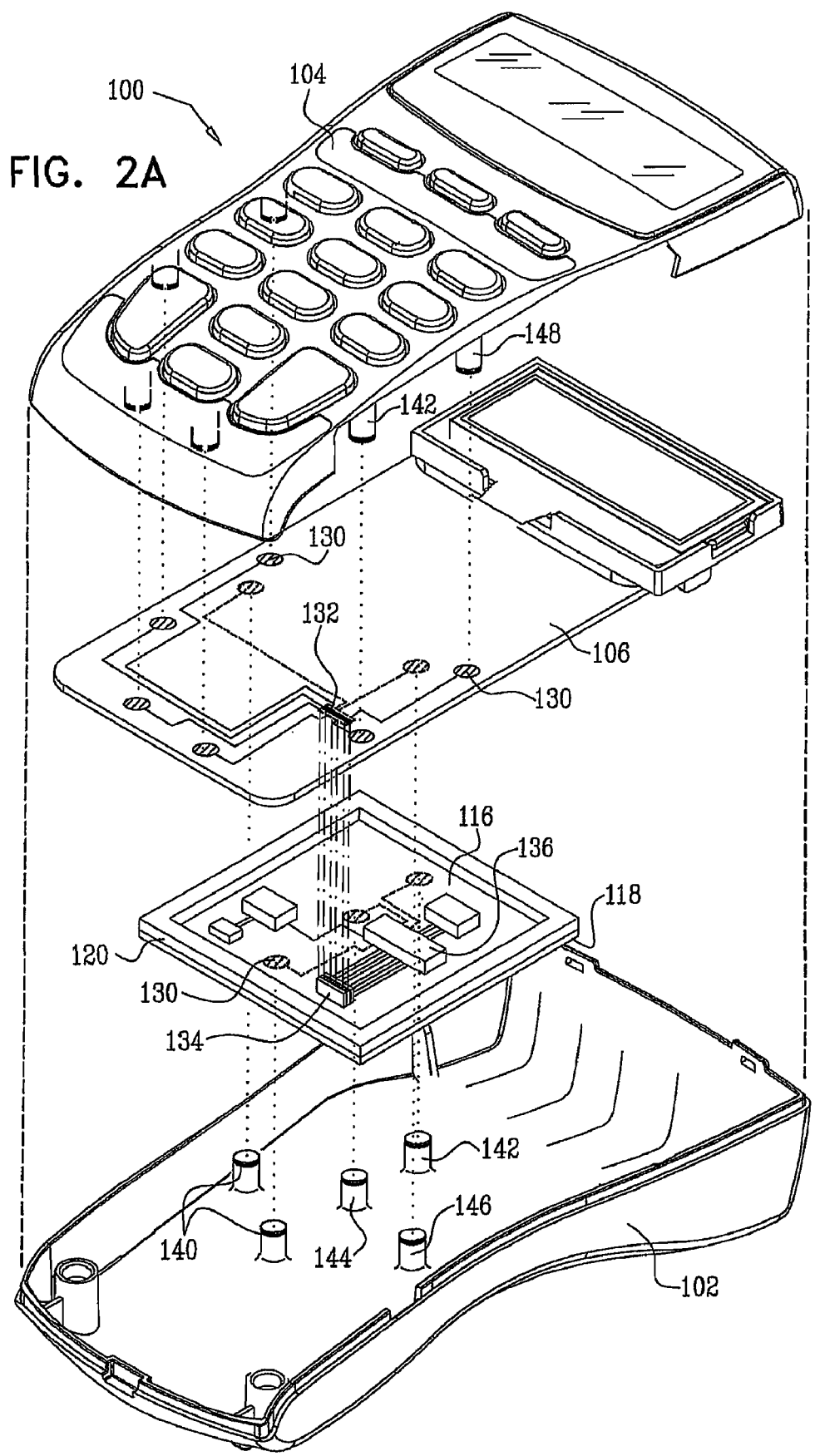

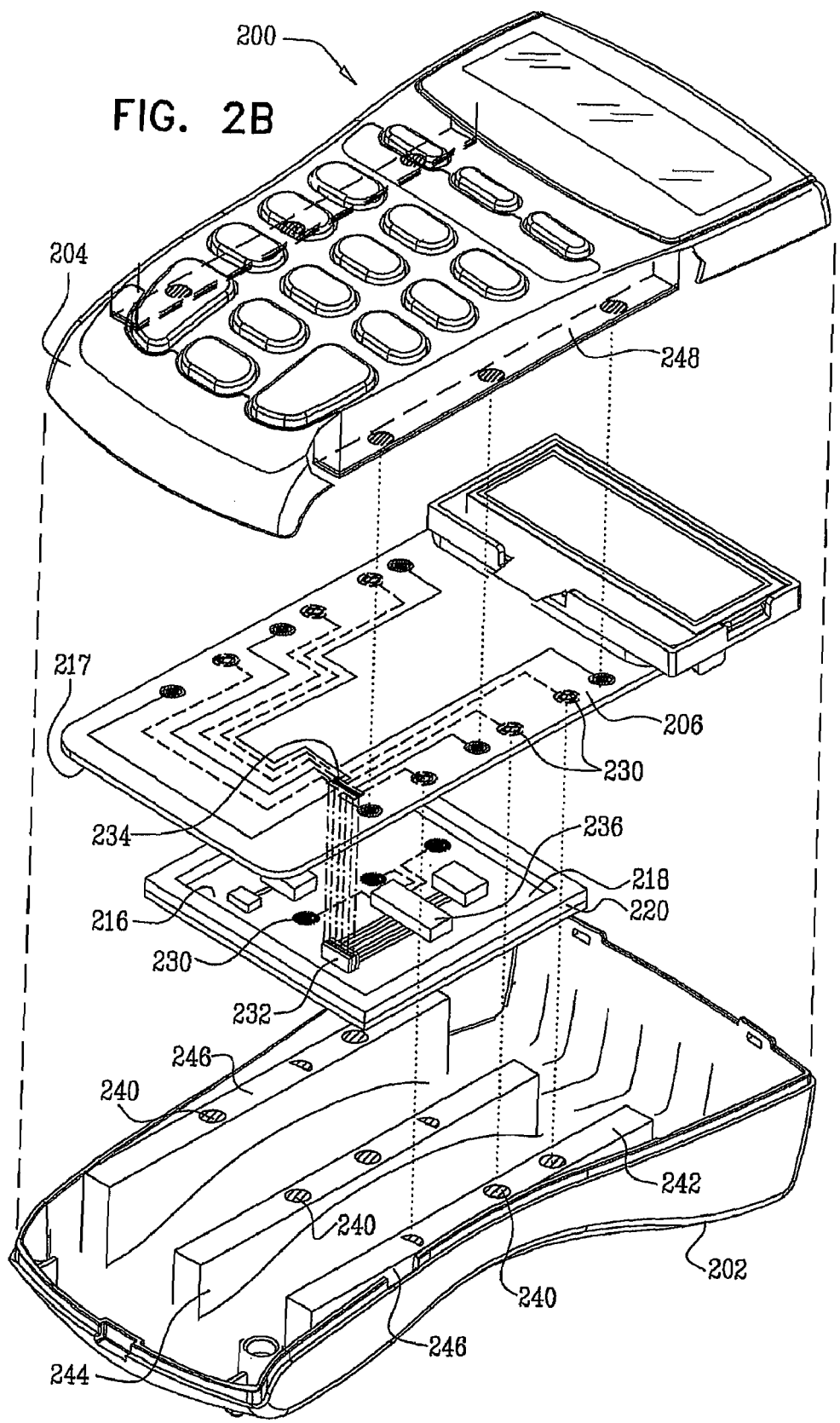

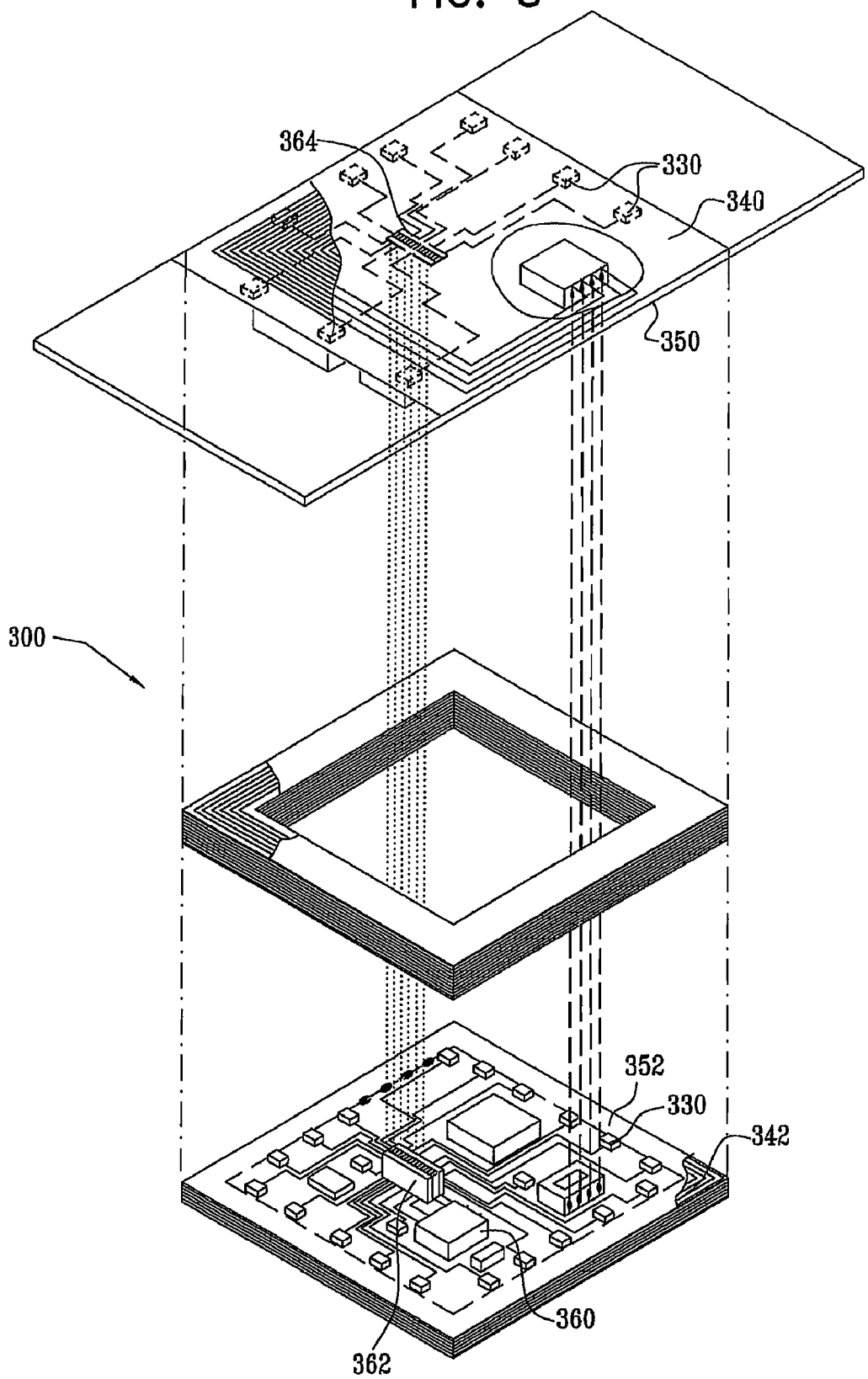

SECURE POINT OF SALE DEVICE EMPLOYING CAPACITIVE SENSORS

FIELD OF THE INVENTION

The present invention relates to point of sale terminals generally and more particularly to security systems useful therewith.

BACKGROUND OF THE INVENTION

The following prior art publication is believed to represent the current state of the art in capacitive security systems:
GB2372363A

SUMMARY OF THE INVENTION

The present invention seeks to provide an improved security system which is particularly useful in a point of sale device and devices employing such system.

There is thus provided in accordance with a preferred embodiment of the present invention a point of sale device including a housing, a protected enclosure located within the housing, information storage functionality located within the protected enclosure and storing information to be protected information, a capacitance sensor based security system including at least one capacitance sensor operative to sense the capacitance of at least one of at least part of the housing and at least part of the protected enclosure at a reference time and thereafter and to provide an alarm indication of at least a predetermined change in the capacitance sensed by the at least one capacitance sensor.

Preferably, the housing includes electrically conductive material. Alternatively or additionally, electrically conductive material is associated with the housing.

Preferably, the protected enclosure includes multiple electrically conductive portions and the capacitance sensor is operative to sense mutual displacement of at least some of the multiple electrically conductive portions.

Preferably, the at least one capacitance sensor is operative to sense introduction of an object having a dielectric constant different from the dielectric constant sensed by the at least one capacitance sensor into the housing. Alternatively or additionally, the at least one capacitance sensor is operative to sense introduction of an object having a dielectric constant different from the dielectric constant sensed by the at least one capacitance sensor into the protective enclosure.

Preferably, multiple electrically conductive portions are located within the housing and the capacitance sensor is operative to sense mutual displacement of at least some of the multiple electrically conductive portions.

Preferably, the capacitance sensor based security system stores within the protected enclosure information representing the capacitance of the at least one of at least part of the housing and at least part of the protected enclosure at the reference time. Additionally or alternatively, the capacitance sensor based security system includes environmental compensation functionality for compensating for changes in at least one of temperature and humidity.

Preferably, the point of sale device also includes capacitance management circuitry located within the protected enclosure. Additionally, the at least one capacitance sensor is coupled to the capacitance management circuitry.

Preferably, at least one of the at least one capacitance sensor is located within the protected enclosure. Alternatively or additionally, at least one of the at least one capacitance sensor is located outside of the protected enclosure.

Preferably, the at least one capacitance sensor includes a central portion spaced from a concentric ring. Additionally, the area of the central portion is similar to the area of the concentric ring.

Preferably, the capacitance sensor based security system provides a personalized capacitive signature for the point of sale device.

Preferably, the alarm indication includes providing an instruction to self destruct circuitry to cause erasure of the protected information and providing an instruction to the information storage functionality to store predetermined irrelevant data.

Preferably, the point of sale device is selected from a set of devices which includes a payment terminal, an electronic cash register, a pin pad, an ATM, a kiosk and a device which stores data in electronic form.

BRIEF DESCRIPTION OF THE DRAWINGS

The present invention will be understood and appreciated more fully from the following detailed description, taken in conjunction with the drawings in which:

FIG. 2A is a simplified exploded view illustration of the point of sale device of FIG. 1A;

FIG. 2B is a simplified exploded view illustration of the point of sale device of FIG. 1B;

FIG. 3 is a simplified exploded view illustration of a protected enclosure forming part of the point of sale device of FIGS. 1A-2B.

DETAILED DESCRIPTION OF PREFERRED EMBODIMENTS

Figure 1A:
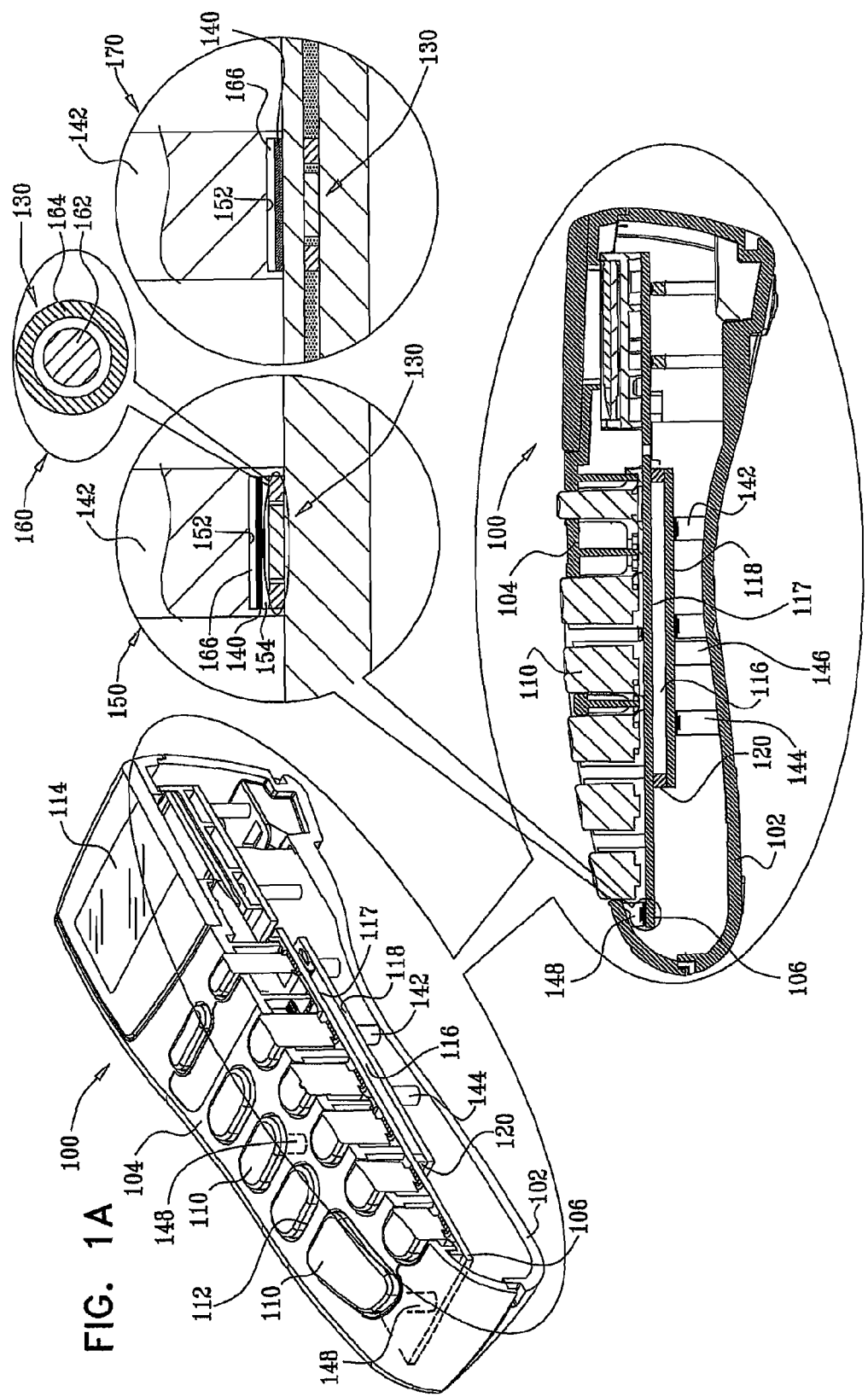
FIG. 1A is a simplified partially pictorial, partially sectional illustration of a point of sale device constructed and operative in accordance with a preferred embodiment of the present invention.

Reference is now made to FIG. 1A, which is a simplified partially pictorial, partially sectional illustration of a point of sale device constructed and operative in accordance with a preferred embodiment of the present invention, and to FIG. 2A, which is a simplified exploded view illustration of the point of sale device of FIG. 1A. For the purposes of the present description and claims, the phrase "point of sale device" includes, inter alia, a payment terminal, an electronic cash register, a pin pad, an ATM, a kiosk and any other device which stores secured electronic data.

As seen in FIGS. 1A and 2A, a point of sale device, here a PIN pad 100, includes a housing formed of a bottom housing portion 102 and a top housing portion 104. A printed circuit board 106 is located within the housing, as is a keypad assembly including keys 110 which extend through corresponding apertures 112 in top housing portion 104. A display 114 is also mounted on top housing portion 104.

A protected enclosure 116 is located within the housing and includes a top enclosure portion 117 defined by a portion of printed circuit board 106, a bottom enclosure portion 118 and a peripheral enclosure portion 120. The protected enclosure 116 is preferably constructed and operative in accordance with the teachings of applicant/assignee's U.S. Pat. No. 6,853,093, the disclosure of which is hereby incorporated by reference.

In accordance with a preferred embodiment of the present invention, anti-tampering functionality is provided in the point of sale device by a capacitance sensor based security system including at least one capacitance sensor operative to sense the capacitance of at least one of at least part of the housing and at least part of the protected enclosure at a reference time and thereafter and to provide an alarm indication of at least a predetermined change in the capacitance sensed by the capacitance sensor.

In the illustrated embodiment of FIGS. 1A and 2A, the capacitance sensor based security system employs a plurality of capacitance sensors 130, preferably incorporated into the printed circuit board 106 and/or portions of the protected enclosure 116, as shown clearly in FIG. 2A. As seen in FIG. 2A, capacitance sensors 130 are coupled via pads 132 and connectors 134 to capacitance management circuitry 136 located within the protected enclosure 116.

In the illustrated embodiment of FIGS. 1A and 2A, conductive elements 140, whose presence and propinquity is sensed by correspondingly located capacitance sensors 130, are mounted on posts 142 and are positioned so as to lie in close proximity to corresponding capacitance sensors 130. Posts 142 include posts, such as those designated by reference numeral 144, which extend from an inner surface of bottom housing portion 104 towards and into engagement with the bottom enclosure portion 118, posts such as those designated by reference numeral 146, which extend from an inner surface of bottom housing portion 104 towards and into engagement with a bottom surface of printed circuit board 106, and posts 148, which extend from an inner surface of top housing portion 102 towards and into engagement with a top surface of printed circuit board 106.

It is appreciated that capacitance sensors 130 may be exposed on a surface of printed circuit board 106 or one of enclosure portions 117, 118 and 120 or may lie below the surface thereof and thus be electrically insulated from the surface.

Where capacitance sensors 130 are exposed on the surface of printed circuit board 106 or one of enclosure portions 117, 118 and 120, the arrangement of the conductive element 140 on post 142 is preferably as shown in enlargement 150 in FIG. 1A. Here it is seen that conductive element 140 is located in a recess 152 formed at an extreme end of post 142 and spaced by a gap 154 from capacitance sensor 130. Preferably the gap 154 is filled with material having a relatively high dielectric constant, such as polycarbonate plastic. In the illustrated embodiment, as shown in enlargement 160, the capacitance sensor 130, formed on a surface of printed circuit board 106, includes a central portion 162, preferably connected to capacitance management circuitry 136, spaced from a concentric ring 164, preferably grounded. The conductive element 140 preferably is attached to an adhesive layer 166 which fixes it within gap 154.

Alternatively, the conductive element 140 may be formed of a conductive material painted on the surface of the post. In another alternative implementation, there is no gap between the conductive material 140 and the printed circuit board such that the conductive material 140 is in physical contact with the PCB material. In the event that the sensor is formed on the printed circuit surface, a non conductive material or an air gap may be located intermediate the conductive material 140 and the sensor.

Preferably, the area of the central portion 162 is similar to the area of the concentric ring 164. In one embodiment, the radius of the central portion 162 may be about 3 mm and the central portion 162 may be spaced from the concentric ring 164 by 0.5 mm. The width of the concentric ring may be about 1.3 mm. The conductive element 140 may be spaced from the capacitance sensor 130 by about 0.25 mm.

Alternatively, the capacitance sensors can be formed in various patterns, for example two parallel lines in a serpentine pattern or any other suitable pattern.

Where capacitance sensors 130 lie below the surface of printed circuit board 106 or one of enclosure portions 117, 118 and 120 and are electrically insulated from the surface thereof, the arrangement of the conductive element on post 142 is preferably as shown in enlargement 170 in FIG. 1A. Here it is seen that conductive element 140 is located in a recess 152 formed at an extreme end of post 142 and contacts the top surface of the printed circuit board. Here too, as shown in enlargement 170, the capacitance sensor 130, formed below the top surface of printed circuit board 106, includes a central portion 162 spaced from a concentric ring 164 and conductive element 140 preferably is attached to an adhesive layer 166 which fixes it to post 142.

Figure 1B:
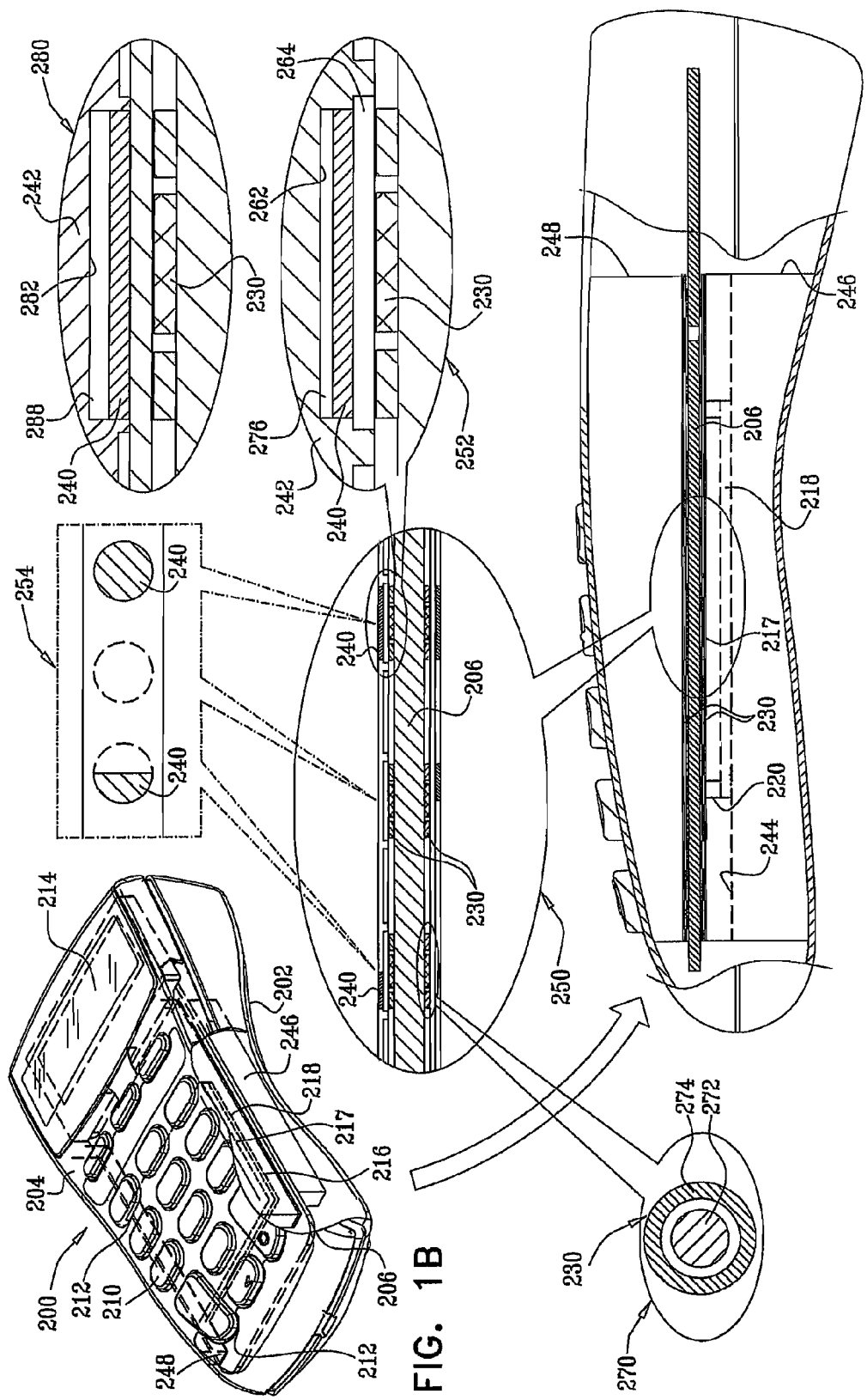
FIG. 1B is a simplified partially pictorial, partially sectional illustration of a point of sale device constructed and operative in accordance with another preferred embodiment of the present invention.

Reference is now made to FIG. 1B, which is a simplified partially pictorial, partially sectional illustration of a point of sale device constructed and operative in accordance with a preferred embodiment of the present invention, and to FIG. 2B, which is a simplified exploded view illustration of the point of sale device of FIG. 1B.

As seen in FIGS. 1B and 2B, a point of sale device, here a PIN pad 200, includes a housing formed of a bottom housing portion 202 and a top housing portion 204. A printed circuit board 206 is located within the housing, as is a keypad assembly including keys 210 which extend through corresponding apertures 212 in top housing portion 204. A display 214 is also mounted on top housing portion 204.

A protected enclosure 216 is located within the housing and includes a top enclosure portion 217 defined by a portion of printed circuit board 206, a bottom enclosure portion 218 and a peripheral enclosure portion 220. The protected enclosure 216 is preferably constructed and operative in accordance with the teachings of applicant/assignee's U.S. Pat. No. 6,853,093, the disclosure of which is hereby incorporated by reference. Alternatively, any other suitable type of protected enclosure may be employed, such as, for example, a secure chip package.

In accordance with a preferred embodiment of the present invention, anti-tampering functionality is provided in the point of sale device 200 by a capacitance sensor based security system including at least one capacitance sensor operative to sense the capacitance of at least one of at least part of the housing and at least part of the protected enclosure at a reference time and thereafter and to provide an alarm indication of at least a predetermined change in the capacitance sensed by the capacitance sensor.

In the illustrated embodiment of FIGS. 1B and 2B, the capacitance sensor based security system employs a plurality of capacitance sensors 230, preferably incorporated into the printed circuit board 206 and/or portions of the protected enclosure 216, as shown clearly in FIG. 2B. As seen in FIG. 2B, capacitance sensors 230 are coupled via connectors 232 and pads 234 to capacitance management circuitry 236 located within the protected enclosure 216.

In the illustrated embodiment of FIGS. 1B and 2B, conductive elements 240, whose presence and propinquity is sensed by correspondingly located capacitance sensors 230, are mounted on elongate raised portions 242 and are positioned so as to lie in close proximity to corresponding capacitance sensors 230. Elongate raised portions 242 include elongate raised portion, such as that designated by reference numeral 244, which extends from an inner surface of bottom housing portion 204 towards and into engagement with the bottom enclosure portion 218, elongate raised portions such as those designated by reference numeral 246, which extend from an inner surface of bottom housing portion 204 towards and into engagement with a bottom surface of printed circuit board 206, and elongate raised portions 248 which extend from an inner surface of top housing portion 202 towards and into engagement with a top surface of printed circuit board 206. The arrangement of the conductive elements 240 on an elongate raised portion 242 is preferably as shown in enlargements 250 and 252. It is seen, as seen in enlargement 254, that conductive elements 240 of differing sizes and shapes may be employed, so as to "personalize" the capacitive signature of individual housing elements. For example, the use of a full circular element provides a different sensed capacitance than the use of a part circular element or the absence of such an element.

It is appreciated that capacitance sensors 230 may be exposed on a surface of printed circuit board 206 or one of enclosure portions 217, 218 and 220 or may lie below the surface thereof and thus be electrically insulated from the surface.

Where capacitance sensors 230 are exposed on the surface of printed circuit board 206 or one of enclosure portions 217, 218 and 220, the arrangement of the conductive elements 240 on an elongate raised portion 242 is preferably as shown in enlargement 252 in FIG. 1B. Here it is seen that each conductive element 240 is located in a recess 262 of elongate raised portion 242 and spaced by a gap 264 from capacitance sensor 230. Preferably the gap 264 is filled with material having a relatively high dielectric constant, such as polycarbonate plastic. In the illustrated embodiment, as shown in enlargement 270, the capacitance sensor 230, formed on a surface of printed circuit board 206, includes a central portion 272 spaced from a concentric ring 274. The conductive element 240 preferably is attached to an adhesive layer 276 which fixes it within gap 264.

Where capacitance sensors 230 lie below the surface of printed circuit board 206 or one of enclosure portions 217, 218 and 220 and are electrically insulated from the surface thereof, the arrangement of the conductive element 240 on elongate raised portion 242 is preferably as shown in enlargement 280 in FIG. 1B. Here it is seen that each conductive element 240 is located in a recess 282 and preferably contacts the top surface of the printed circuit board 206. Here too, as shown in enlargement 280, the capacitance sensor 230, formed below the top surface of printed circuit board 206, includes a central portion 272 spaced from a concentric ring 274 and conductive element 240 preferably is attached to an adhesive layer 288 which fixes it to elongate raised portion 242.

Reference is now made to FIG. 3, which is a simplified exploded view illustration of a protected enclosure 300 forming part of the point of sale devices of FIGS. 1A-2B, which may be similar or identical to protected enclosure 116, described hereinabove with reference to FIGS. 1A & 2A, and protected enclosure 216, described hereinabove with reference to FIGS. 1B & 2B.

As seen in FIG. 3, a plurality of capacitance sensors 330, which may be identical to sensors 130 (FIGS. 1A & 2A) and 230 (FIGS. 1B & 2B), are distributed about all or part of the periphery of top and bottom enclosure portions 340 and 342. In the illustrated embodiment, the capacitance sensors 330 preferably are located adjacent respectively inwardly facing surfaces 350 and 352 of enclosure portions 340 and 342. Additional capacitance sensors 330 may be distributed within the enclosure defined by top and bottom enclosure portions 340 and 342. Sensors 330 are preferably all coupled to capacitance management circuitry 360 located within protected enclosure 300, via connectors 362 and pads 364. Capacitance management circuitry 360 may be identical to capacitance management circuitry 136, described hereinabove with reference to FIGS. 1A and 2A, and capacitance management circuitry 236, described hereinabove with reference to FIGS. 1B & 2B. The capacitance management circuitry 360 is operative to sense insertion of conductors, Such as probes, within protected enclosure 360, as well as other types of tampering with the protected enclosure 300.

Figure 4:
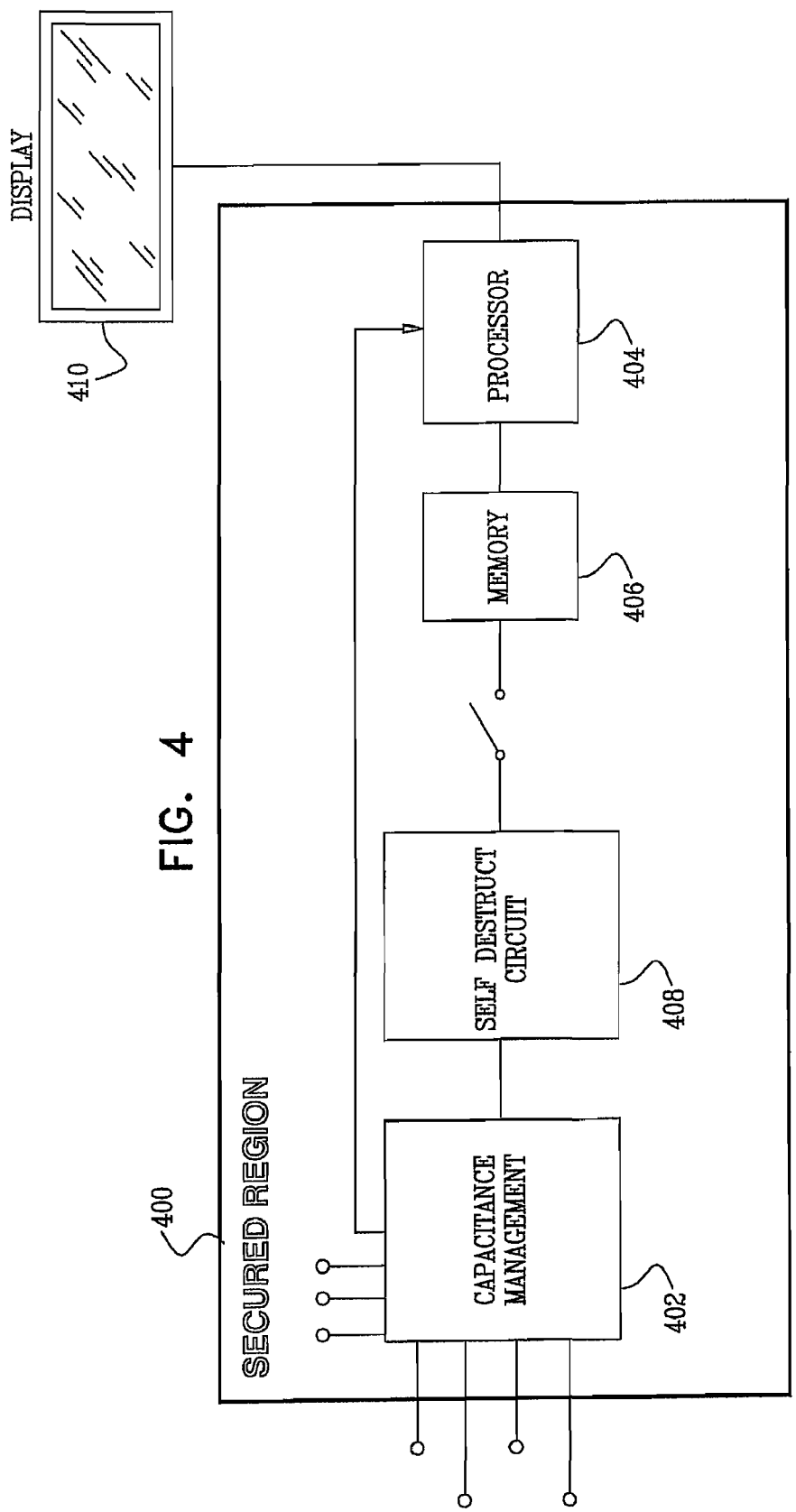
FIG. 4 is a simplified block diagram illustration of the functionality of the point of sale devices of FIGS. 1A-2B.

Reference is now made to FIG. 4, which is a simplified block diagram illustration of the capacitance sensor based security system described in various embodiments hereinabove with reference to one or more of FIGS. 1A-3. Capacitance sensors, such as sensors 130 & 230, located outside a protected enclosure 400, and sensors 330, located inside protected enclosure 400, are coupled to capacitance management circuitry 402, such as circuitry 136, 236 and 360 described hereinabove.

Capacitance management circuitry 402 is preferably embodied in an integrated circuit, such as an AD7142 of Analog Devices or a CapSense of Cypress Semiconductor and may include temperature, humidity and environmental drift compensation functionality. Capacitance management circuitry 402 preferably provides reference and current capacitance metric outputs to a processor 404, which typically stores the outputs in a RAM 406 and makes a determination of whether changes in sensed capacitance exceed predetermined thresholds and indicate tampering. If tampering is indicated, the capacitance management circuitry provides a suitable instruction to self destruct circuitry 408 to cause erasure of the data stored in RAM 406 and preferably also to cause the processor 404 to write predetermined irrelevant data to RAM 406. It is appreciated that self destruct circuitry 408 may be responsive to other types of events outside the scope of the present invention. It is appreciated that the secured data can be stored in the capacitance management circuitry 402, in microprocessor 404 or in any other suitable memory.

It is appreciated that the capacitance management circuitry 402 can be embodied in an integrated circuit or alternatively in a hard wired circuit employing discrete components. Changes in capacitance value can be detected without employing a conventional memory chip, but instead by using electronic circuitry having an integrator and comparator. In such a case the output voltage of the capacitance sensor is inputted to the integrator and to a first input of the comparator. The output of the integrator is inputted to a second input of the comparator. A tamper indication is displayed when the output of the comparator exceeds a predetermined value.

It is appreciated that in the structure described hereinabove a sensible change in capacitance occurs when the housing or the protected enclosure 400 is opened or when the protected enclosure 400 is compromised, for example, by introduction of a material having a dielectric constant different from the dielectric constant sensed by the capacitance sensors, into the protected enclosure 400. Preferably, each individual point of sale device has a unique set of capacitance values sensed by various capacitance sensors located therein, providing a "personalized" signature for each point of sale device. Replacement of part of a housing by another similar part will necessarily produce a different signature and result in a tamper indication and/or self-destruction of sensitive information and/or components.

The threshold level of a change in capacitance which indicates tampering can be dependent on timing, magnitude and other characteristics of the capacitance change. For example, if the terminal falls and vibrates, there might be short term changes in capacitance which disappear following a relatively short time.

It is also appreciated that conductive elements 140 and 240 are preferably formed of materials having a dielectric constant which is significantly different from that of the environment, i.e. the air, the housing or the material on which they are mounted.

Personalization of the sensed capacitance signature of point of sale devices also can be achieved by adding elements, such as conductive elements, at regions to be protected. Even when such elements are not added, there might be cases where each point of sale device has a different capacitive signature, because the electronic elements are not embedded exactly at the same location or some conductive materials are not identically located in all devices.

It will be appreciated by persons skilled in the art that the present invention is not limited to what has been particularly shown and described hereinabove. Rather the scope of the present invention includes both combinations and subcombinations of various feature described hereinabove as well as modifications and variations thereof which would occur to a person skilled in the art upon reading the foregoing description and which are not in the prior art.

The invention claimed is:

1. A point of sale device comprising:
   a housing;
   multiple electrically conductive portions located within said housing;
   a protected enclosure located within said housing;
   information storage functionality located within said protected enclosure and storing information to be protected information;
   a capacitance sensor based security system including at least one capacitance sensor operative to sense the capacitance of at least one of at least part of said housing and at least part of said protected enclosure at a reference time and thereafter and to provide an alarm indication of at least a predetermined change in said capacitance sensed by said at least one capacitance sensor, said capacitance sensor being operative to sense displacement of at least some of said multiple electrically conductive portions which are galvanically unconnected with said capacitance sensor, said displacement being the result of tampering with at least one of said housing and said protected enclosure.

2. A point of sale device according to claim 1 and wherein said housing includes electrically conductive material.

3. A point of sale device according to claim 1 and wherein electrically conductive material is associated with said housing.

4. A point of sale device according to claim 1 and wherein said protected enclosure comprises multiple electrically conductive portions and wherein said capacitance sensor is operative to sense mutual displacement of at least some of said multiple electrically conductive portions.

5. A point of sale device according to claim 1 and wherein said at least one capacitance sensor is operative to sense introduction of an object having a dielectric constant different from the dielectric constant sensed by said at least one capacitance sensor into said housing.

6. A point of sale device according to claim 1 and wherein said at least one capacitance sensor is operative to sense introduction of an object having a dielectric constant different from the dielectric constant sensed by said at least one capacitance sensor into said protective enclosure.

7. A point of sale device according to claim 1 and wherein said capacitance sensor based security system stores within said protected enclosure information representing said capacitance of said at least one of at least part of said housing and at least part of said protected enclosure at said reference time.

8. A point of sale device according to claim 1 and wherein said capacitance sensor based security system includes environmental compensation functionality for compensating for changes in at least one of temperature and humidity.

9. A point of sale device according to claim 1 and also comprising capacitance management circuitry located within said protected enclosure.

10. A point of sale device according to claim 9 and wherein said at least one capacitance sensor is coupled to said capacitance management circuitry.

11. A point of sale device according to claim 10 and wherein at least one of said at least one capacitance sensor is located within said protected enclosure.

12. A point of sale device according to claim 10 and wherein at least one of said at least one capacitance sensor is located outside of said protected enclosure.

13. A point of sale device according to claim 1 and wherein said at least one capacitance sensor includes a central portion spaced from a concentric ring.

14. A point of sale device according to claim 13 and wherein the area of said central portion is similar to the area of said concentric ring.

15. A point of sale device according to claim 1 and wherein said capacitance sensor based security system provides a personalized capacitive signature for said point of sale device.

16. A point of sale device according to claim 1 and wherein said alarm indication comprises:
    providing an instruction to self destruct circuitry to cause erasure of said protected information; and
    providing an instruction to said information storage functionality to store predetermined irrelevant data.

17. A point of sale device according to claim 1 and wherein said point of sale device is selected from a set of devices which includes a payment terminal, an electronic cash register, a pin pad, an ATM, a kiosk and a device which stores data in electronic form.

18. A point of sale device comprising:
    a housing;
    multiple electrically conductive portions located within said housing;
    information storage functionality located within said housing and storing information to be protected information;
    a capacitance sensor based security system including at least one capacitance sensor operative to sense the capacitance of at least part of said housing at a reference time and thereafter and to provide an alarm indication of at least a predetermined change in said capacitance sensed by said at least one capacitance sensor, said capacitance sensor being operative to sense displacement of at least some of said multiple electrically conductive portions which are galvanically unconnected with said capacitance sensor, said displacement being the result of tampering with said housing.

19. A point of sale device according to claim 18 and wherein said housing includes electrically conductive material.

20. A point of sale device according to claim 18 and wherein electrically conductive material is associated with said housing.

21. A point of sale device according to claim 18 and wherein said at least one capacitance sensor is operative to sense introduction of an object having a dielectric constant different from the dielectric constant sensed by said at least one capacitance sensor into said housing.

22. A point of sale device according to claim 18 and wherein said capacitance sensor is operative to sense mutual displacement of at least some of said multiple electrically conductive portions.

23. A point of sale device according to claim 18 and wherein said capacitance sensor based security system stores information representing said capacitance of said at least part of said housing at said reference time.

24. A point of sale device according to claim 18 and wherein said capacitance sensor based security system includes environmental compensation functionality for compensating for changes in at least one of temperature and humidity.

25. A point of sale device according to claim 18 and also comprising capacitance management circuitry located within said housing.

26. A point of sale device according to claim 25 and wherein said at least one capacitance sensor is coupled to said capacitance management circuitry.

27. A point of sale device according to claim 18 and wherein said at least one capacitance sensor includes a central portion spaced from a concentric ring.

28. A point of sale device according to claim 27 and wherein the area of said central portion is similar to the area of said concentric ring.

29. A point of sale device according to claim 18 and wherein said capacitance sensor based security system provides a personalized capacitive signature for said point of sale device.

30. A point of sale device according to claim 18 and wherein said alarm indication comprises:
   providing an instruction to self destruct circuitry to cause erasure of said protected information; and
   providing an instruction to said information storage functionality to store predetermined irrelevant data.

31. A point of sale device according to claim 18 and wherein said point of sale device is selected from a set of devices which includes a payment terminal, an electronic cash register, a pin pad, an ATM, a kiosk and a device which stores data in electronic form.

* * * * *